United States Patent [19]

Suwa et al.

[11] Patent Number: 4,895,732

[45] Date of Patent: Jan. 23, 1990

[54] CHOCOLATE

[75] Inventors: Nobuyuki Suwa, Sagamihara; Akifumi Yuki, Tokorozawa, both of Japan

[73] Assignee: Mitsubishi Kasei Corporation, Japan

[21] Appl. No.: 227,760

[22] Filed: Aug. 3, 1988

[30] Foreign Application Priority Data

Aug. 5, 1987 [JP] Japan .................................. 62-196097

[51] Int. Cl.$^4$ ............................................... A23G 3/00
[52] U.S. Cl. ....................................... 426/660; 426/604
[58] Field of Search ................................ 426/660, 604

[56] References Cited

U.S. PATENT DOCUMENTS

| | | | |
|---|---|---|---|
| 2,216,660 | 10/1940 | Cook et al. | 426/660 |
| 2,244,569 | 6/1941 | Penn | 426/660 |
| 2,586,615 | 2/1952 | Cross | 426/660 |
| 2,975,063 | 3/1961 | Prenton et al. | 426/660 |
| 3,560,225 | 2/1971 | Wonsiewicz et al. | 426/660 |
| 3,649,647 | 3/1972 | Masanori et al. | 426/660 |
| 4,234,618 | 11/1980 | Jasko et al. | 426/660 |
| 4,613,514 | 9/1986 | Maruzeni et al. | 426/660 |

FOREIGN PATENT DOCUMENTS

| | | |
|---|---|---|
| 709244 | 5/1954 | United Kingdom . |
| 891205 | 3/1962 | United Kingdom . |
| 1316079 | 5/1973 | United Kingdom . |
| 1495254 | 12/1977 | United Kingdom . |

OTHER PUBLICATIONS

Minifie "Chocolate, Cocoa & Confectionary Science & Technology", Ave. Publishing Company, Westport, Conn., pp. 124–127, 208–217, 494–503, (1982).

*Primary Examiner*—R. B. Penland
*Attorney, Agent, or Firm*—Jordan B. Bierman

[57] ABSTRACT

A chocolate comprising a hard butter and a sucrose fatty acid ester, wherein said hard butter is a nontempering type and said sucrose fatty acid ester comprises capric acid, lauric acid or myristic acid as a constituting fatty acid and has an average degree of substitution of the fatty acid to the sucrose of 4 to 7, is disclosed. This chocolate scarcely suffers from any fat bloom upon storage and thus is highly preferable.

6 Claims, No Drawings

CHOCOLATE

BACKGROUND OF THE INVENTION

1. Field of the Invention

This invention relates to a chocolate product comprising a hard butter.

2. Prior Art

Chocolates are prepared by using, for example, cacao mass, cocoa butter, sugar and milk powder as starting materials. Various hard butters have been employed as a substitute for cocoa butter which is expensive and supplied in an unstable manner. The application of these hard butters, which are not only inexpensive but also enable the control of the melting point of a chocolate product, has been spreading with the recent diversification of chocolate products.

Hard butters are classified into tempering type and nontempering type. Nontempering type hard butters include lauric hard butters comprising lauric acid as the main constituting fatty acid and nonlauric ones comprising a trans form unsaturated fatty acid as the main constituting fatty acid.

These hard butters are mainly employed in the production of mold-type chocolates obtained by molding, coating or enrobing chocolates used for coating cakes or biscuits, soft chocolates, white chocolates and colored chocolates.

A chocolate product comprising cocoa butter or a hard butter would seem as if it were coated with white powder upon storage, in particular, under wide fluctuations of temperature. This phenomenon is called fat bloom and significantly damages the commercial value of the product.

It is believed that this fat bloom is caused by the conversion of fat microcrystals into coarse ones.

Fat bloom is frequently observed, in particular, in a chocolate products comprising a lauric hard butter. For example, the surface of such a chocolate product comprising a lauric hard butter together with cocoa butter in an amount of only 5% or less of the total fat components would be coated with white spots, i.e., fat bloom, upon prolonged storage. Further, fat bloom is observed in a white or colored chocolate free from any cocoa powder and significantly lowers the commercial value of the same. Furthermore, fat bloom is frequently observed in a chocolate product comprising a nonlauric hard butter which contains 20 to 30%, based on the total fat components, of cocoa butter in order to improve the flavor of the product.

There has been attempted to prevent fat bloom by, for example, improving a process for producing a chocolate, modifying a hard butter or adding an emulsifier as a fat bloom inhibitor. However, none of these method can give a satisfactory result.

JP-B-45-13428 (the term "JP-B" as used herein refers to an "examined Japanese patent publication") discloses a process for producing a milk chocolate by adding 0.1 to 2% by weight of a sucrose fatty acid ester having an HLB of 5 or below to a milk chocolate composition comprising a large amount, i.e., 20% or above on a solid basis of milk. This process aims at producing a chocolate product having no irritating taste originating from milk but an excellent flavor and a high meltability in mouth. According to the specification of this patent, the sucrose fatty acid ester to be used therein has an HLB of 5 or below and comprises bound fatty acids carrying 12 to 22 carbon atoms, though one comprising 70% of stearic acid and 30% of palmitic acid as constituting fatty acids is exclusively shown as an effective sucrose fatty acid ester in Examples. It has been proved in Examples of the present invention that the sucrose fatty acid ester having an HLB of 1 as shown in Example 2 of the above patent is ineffective in preventing fat bloom of a chocolate comprising a nontempering type hard butter.

JP-B-49-28990 discloses a process for producing a chocolate which shows no fat bloom and has a low viscosity, an excellent gloss and a high resistance to heat distortion. This process comprises a composition, which comprises a sucrose fatty acid ester having an HLB of 5 to 7 which is a mixture of mono-, di- or triesters of sucrose and higher fatty acids carrying 10 to 22 carbon atoms, lecithin, a fat of a high hardness and anhydrous glucose, to a chocolate comprising a tempered cocoa butter as a fat component. In contrast thereto, the sucrose fatty acid ester to be used in the present invention has an HLB of 2 or less and is effective in a chocolate comprising a nontempering type hard butter. In addition, it is unnecessary in the present invention to formulate the sucrose fatty acid ester into a composition.

Effects of sucrose fatty acid esters of lowering the viscosity of a chocolate are described in a report entitled "The Influence of Some Surfactants on the Viscosity of Confectionery Fat/Sugar Mixtures" (cf. Int. Chocolate Review, 24 (12), 478 (1969)). However, the sucrose fatty acid esters whose effects are examined in this report are mono- or diesters of a degree of substitution of 1 or 2 and none of sucrose fatty acid esters of a higher degree of substitution, i.e., 4 to 7 to be used in the present invention is discussed therein.

A decrease in the viscosity of a milk- or sweet-chocolate caused by adding a sucrose fatty acid ester thereto is discussed in a report entitled "The Effect of Sucrose Esters in Chocolate and Cocoa (cf. Int. Chocolate Review, 20 (4), 142 (1965)). However, the effects of only four sucrose fatty acid esters, i.e., Nitto Ester 1005, 1007, 1009 and 1011 are discussed therein. According to this report, Nitto Ester 1007 has an HLB of 7 and thus it is different from those having an HLB of 2 or below to be used in the present invention.

The roles of surfactants in chocolates and compound coating are described in a report entitled "Surfactants" (cf. The Manufacturing Confectioner", 105 (1987)). Although there is reported that a surfactant can impart a resistance against fat bloom to a chocolate, the sucrose fatty acid esters employed therein are simply called in the general name "sucrose fatty acid esters" and those having a specific constituting fatty acids, which are to be employed in the present invention, are not reported therein.

SUMMARY OF THE INVENTION

The present invention resides in providing a chocolate comprising a hard butter and a sucrose fatty acid ester, wherein said hard butter is a nontempering type and said sucrose fatty acid ester comprises capric acid, lauric acid or myristic acid as a constituting fatty acid and has an average degree of substitution of the fatty acid to the sucrose of 4 to 7.

DETAILED DESCRIPTION OF THE INVENTION

The nontempering type hard butter to be used in the present invention as a substitute for cocoa butter include lauric hard butters and nonlauric ones. The latter include high trans form acid hard butters and random distribution glyceride composition hard butters. A lauric hard butter may be produced from fat(s) containing a large amount of lauric acid such as coconut oil, palm kernel oil or babassu oil by combining procedures such as hydrogenation, interesterification or solvent fractionation. A high trans form acid hard butter may be produced by selectively hydrogenating nonlauric fat(s) containing a large amount of unsaturated fatty acids such as soybean oil, cotton seed oil, corn oil, palm oil or rapeseed oil to thereby elevate the content of trans acid unsaturated fatty acids such as elaidic acid therein and then solvent-fractionating the obtained product. A random distribution glyceride composition hard butter may be produced by making the glyceride distribution of an optionally hydrogenated natural oil or a mixture thereof random through interesterification with a specific catalyst and then solvent-fractionating the product.

The sucrose fatty acid ester to be used in the present invention comprises a saturated fatty acid carrying 14 or less of carbon atoms as the main constituting fatty acid of the ester and has an average degree of substitution of 4 to 7.

The term "average degree of substitution" as used herein means the average number of fatty acid molecules bound to a sucrose molecule to thereby form an ester. Examples of the bound fatty acid include myristic acid, lauric acid and capric acid and myristic acid and lauric acid are particularly preferable among them. The sucrose fatty acid ester to be used in the present invention comprises 50% or more, preferably 60% or more, of myristic and/or lauric acid, based on the total constituting fatty acids.

In the present invention, the sucrose fatty acid ester is added in an amount of 0.1 to 5% by weight, preferably 0.3 to 2% by weight, based on the chocolate composition in order to inhibit fat bloom.

When the amount of the sucrose fatty acid ester is smaller than 0.1% by weight, the resulting effect is limited. When it exceeds 5% by weight, on the other hand, the resulting effect is not improved any more.

The chocolate product of the present invention which comprises a nontempering type hard butter and a sucrose fatty acid ester may be produced in a conventional manner.

That is to say, it may be obtained by subjecting appropriate materials such as cacao mass, cacao powder, cocoa butter, milk powder and sugar to, for example, rolling, conching and tempering.

Alternatively, the tempering step may be omitted in the case of, for example, a chocolate coating.

The chocolate product of the present invention may further comprise other emulsifiers such as sorbitan fatty acid esters, polyglycerol fatty acid esters of glycerol fatty acid esters, if required.

The present invention is hereinafter described in greater detail with reference to examples, which are not to be construed as limiting the scope thereof. Unless otherwise indicated, all parts, percents and ratios are by weight.

EXAMPLES 1 TO 4 AND REFERENTIAL EXAMPLES 1 TO 7

1 g of each emulsifier as shown in Table 1 was added to 100 g of a chocolate of the following composition and thoroughly dissolved therein at 50° C. Then the obtained mixture was solidified by cooling in a refrigerator in a heart-shaped mold of approximately 10 cm in diameter. Then, 1 portion of the molded chocolate was stored at 20° C. for 4 months and then at 25° C, while another portion was stored at room temperature, i.e., 20° to 30° C. and the occurrence and degree of fat bloom on the surface of the same were observed.

| Material Composition | (g) |
| --- | --- |
| Cocoa Powder | 16 |
| Powdery Sugar | 53 |
| Lauric Hard Butter (m.p.: 34° C.) | 31 |
| Lecithin | 0.4 |

The fat bloom was evaluated according to the following criterion:

| | |
| --- | --- |
| − | No fat bloom |
| ± | Slight fat bloom |
| + | Fat bloom |
| ++ | Obvious fat bloom |
| +++ | Extremely obvious fat bloom |
| ++++ | Coating the whole surface |

Table 2 shows the results.

EXAMPLES 5 TO 9 AND REFERENTIAL EXAMPLES 8 AND 9

Each emulsifier as shown in Table 1 was blended with 100 g of a chocolate of the following composition and thoroughly dissolved therein at 55° C. Then, the obtained mixture was poured into a heart-shaped mold of approximately 10 cm in diameter and solidified by cooling in a refrigerator at 5° C. The molded chocolate was stored at 20° C. and the occurrence and extent of fat bloom were observed with the lapse of time.

| Material Composition | (g) |
| --- | --- |
| Cocoa Powder | 15 |
| Powdery Sugar | 50 |
| Lauric Hard Butter (m.p.: 34° C.) | 35 |
| Lecithin | 0.4 |

The fat bloom was evaluated in the same manner as the one described in Examples 1 to 4.

Table 3 shows the results.

TABLE 1

| Emulsifier | Constituting Fatty Acid | Average Degree of Substitution | HLB |
| --- | --- | --- | --- |
| Sucrose Laurate{ | | | |
| Ryoto Sugar Ester L-295 | Lauric Acid: About 95% | 4.4 | 2 |
| Ryoto Sugar Ester L-195 | Lauric Acid: About 95% | 5.5 | 1 |
| Ryoto Sugar Ester L-095 | Lauric Acid: About 95% | 6.6 | >1 |
| Sucrose Caprate* | | | |
| Ryoto Sugar Ester CT-195 | Capric Acid: About 95% | 5.3 | 1 |

TABLE 1-continued

| Emulsifier | Constituting Fatty Acid | Average Degree of Substitution | HLB |
|---|---|---|---|
| Sucrose Myristate* Ryoto Sugar Ester M-095 | Myristic Acid: About 95% | 6.1 | >1 |
| Sucrose Stearate* Ryoto Sugar Ester S-170 | Stearic Acid: About 70% Palmitic Acid: About 30% | 5.5 | 1 |
| Sucrose Palmitate* Ryoto Sugar Ester P-170 | Palmitic Acid: About 70% Stearic Acid: About 30% | 5.5 | 1 |
| Sucrose Oleate* Ryoto Sugar Ester O-170 | Oleic Acid: About 70% | 5.3 | 1 |
| Sorbitan Tristearate** SPAN 65 | | | |
| Hexaglycerol Pentastearate*** SY Glyster PS-500 | | | |
| Glycerol Monooleate**** Emulsy MO | | | |

Note:
*Manufactured by Mitsubishi Kasei Corporation
**Manufactured by Kao Soap Co., Ltd.
***Manufactured by Sakamoto Yakuhin Kogyo Co., Ltd.
****Manufactured by Riken Vitamin Co., Ltd.

TABLE 2

| | Emulsifier | Average Degree of Substitution | Content in Chocolate (%) | Fat Bloom 25° C. 10 Months | Fat Bloom Room Temperature 12 Months |
|---|---|---|---|---|---|
| Example 1 | Sucrose Laurate L-295 | 4.4 | 1.0 | — | — |
| Example 2 | Sucrose Laurate L-195 | 5.5 | 1.0 | — | — |
| Example 3 | Sucrose Laurate L-095 | 6.6 | 1.0 | ± | ± |
| Example 4 | Sucrose Caprate CT-195 | 5.3 | 1.0 | ± | ± |
| Referential Example 1 | None | — | 0 | ++++ | +++ |
| Referential Example 2 | Sucrose Stearate S-170 | 5.0 | 1.0 | ++++ | ++++ |
| Referential Example 3 | Sucrose Palmitate P-170 | 5.5 | 1.0 | ++++ | +++ |
| Referential Example 4 | Sucrose Oleate O-170 | 5.3 | 1.0 | ++++ | ++++ |
| Referential Example 5 | Sorbitan Tristerate | | 1.0 | +++ | +++ |
| Referential Example 6 | Hexaglycerol Pentastearate | | 1.0 | ++++ | ++++ |
| Referential Example 7 | Glycerol Monooleate | | 1.0 | ++++ | +++ |

TABLE 3

| | Emulsifier | Average Degree of Substitution | Content in Chocolate (%) | Fat Bloom at 20° C., 6 Months |
|---|---|---|---|---|
| Example 5 | Sucrose Laurate L-195 | 5.5 | 0.35 | ± |
| Example 6 | Sucrose Laurate L-195 | 5.5 | 0.7 | — |
| Example 7 | Sucrose Laurate L-195 | 5.5 | 1.0 | — |
| Example 8 | Sucrose Myristate M-095 | 6.1 | 0.35 | — |
| Example 9 | Sucrose Myristate M-095 | 6.1 | 0.7 | — |
| Referential Example 8 | None | — | 0 | ++++ |
| Referential Example 9 | Sucrose Stearate S-170 | 5.0 | 1.0 | +++ |

EXAMPLE 10 AND REFERENTIAL EXAMPLES 10 TO 15

1 g of each emulsifier as shown in Table 1 was added to 100 g of the following chocolate A or B and thoroughly dissolved therein at 50° C. Then, the mixture was poured into a heart-shaped mold of approximately 10 cm in diameter and solidified by cooling in a refrigerator at 5° C. The molded chocolate was aged at 25° C. for a day and then stored at room temperature, i.e., 20° to 30° C. and the occurrence and extent of fat bloom was observed with the lapse of time in the same manner as the one described in Examples 1 to 4.

Material Composition:

Chocolate A comprising 20% of cocoa butter based on the total fat components

|  | (g) |
| --- | --- |
| Cocoa Powder | 20 |
| Powdery Sugar | 44.6 |
| Nonlauric Hard Butter (m.p.: 35° C.) | 30 |
| Cocoa Butter | 5.4 |
| Lecithin | 0.3 |

Chocolate B comprising 30% of cocoa butter based on the total fat components

|  | (g) |
| --- | --- |
| Cocoa Powder | 20 |
| Powdery Sugar | 45 |
| Nonlauric Hard Butter (m.p.: 35° C.) | 25.9 |
| Cocoa Butter | 9.1 |
| Lecithin | 0.3 |

Table 4 shows the results.

TABLE 4

| Example No. | Emulsifier | Average Degree of Substitution | Fat Bloom* Cocoa Butter Content** | |
| --- | --- | --- | --- | --- |
| | | | 20% | 30% |
| Example 10 | Sucrose Laurate L-195 | 5.5 | ± | + |
| Referential Example 10 | None | — | ++ | ++++ |
| Referential Example 11 | Sucrose Stearate S-170 | 5.0 | ++++ | ++++ |
| Referential Example 12 | Sucrose Palmitate P-170 | 5.5 | ++++ | +++ |
| Referential Example 13 | Sucrose Oleate O-170 | 5.3 | ++++ | +++ |
| Referential Example 14 | Sorbitan Tristearate | | +++ | +++ |
| Referential Example 15 | Hexaglycerol Pentastearate | | ++++ | ++++ |

Note:
*Stored at room temperature for 18 months.
**Based on the total fat components.

The chocolate of the present invention comprising a hard butter and a sucrose fatty acid ester enables the production of a chocolate product or a compound coating suffering from no fat bloom, which can be hardly obtained by conventional methods.

While the invention has been described in detail and with reference to specific embodiments thereof, it will be apparent to one skilled in the art that various changes and modifications can be made therein without departing from the spirit and scope thereof.

What is claimed is:

1. A chocolate consisting essentially of a hard butter and at least 0.1% by weight of a sucrose fatty acid ester, wherein said hard butter is a nontempering type and said sucrose fatty acid ester consisting essentially of capric acid, lauric acid or myristic acid as a constituting fatty acid and has an average degree of substitution of the fatty acid on the sucrose of 4 to 7, said sucrose fatty acid ester having an HLB of not more than 2.

2. The chocolate according to claim 1, wherein the sucrose fatty acid ester comprises 50% or more of capric acid, myristic acid and/or lauric acid, based on the total constituting fatty acid.

3. The chocolate according to claim 2, wherein the sucrose fatty acid ester comprises 60% or more of capric acid, myristic acid and/or lauric acid, based on the total constituting fatty acid.

4. The chocolate of claim 1 wherein there is at least 0.3% by weight of said ester present.

5. The chocolate of claim 4 wherein there is a maximum of 2% by weight of said ester present.

6. The chocolate of claim 1 wherein there is a maximum of 5% by weight of said ester present.

* * * * *